United States Patent
Paterson et al.

(10) Patent No.: US 7,857,890 B2
(45) Date of Patent: Dec. 28, 2010

(54) AIR CLEANER INCLUDING OZONE REMOVAL

(75) Inventors: Christopher M. Paterson, Biloxi, MS (US); Charles W. Reynolds, Long Beach, MS (US)

(73) Assignee: Oreck Holdings, LLC, Cheyenne, WY (US)

( * ) Notice: Subject to any disclaimer, the term of this patent is extended or adjusted under 35 U.S.C. 154(b) by 389 days.

(21) Appl. No.: 11/364,444

(22) Filed: Feb. 28, 2006

(65) Prior Publication Data
US 2007/0199447 A1    Aug. 30, 2007

(51) Int. Cl.
*B01D 53/66*    (2006.01)
*B01D 53/86*    (2006.01)

(52) U.S. Cl. .............. 95/57; 95/138; 96/15; 422/177; 423/219

(58) Field of Classification Search .......... 95/138, 95/57; 96/15, 55, 74, 121, 134, 154; 422/177, 422/186.07; 423/219, 581
See application file for complete search history.

(56) References Cited

U.S. PATENT DOCUMENTS

| | | | | |
|---|---|---|---|---|
| 3,804,942 A | * | 4/1974 | Kato et al. ............... | 423/239.1 |
| 4,133,652 A | * | 1/1979 | Ishikawa et al. ........... | 96/58 |
| 4,990,311 A | * | 2/1991 | Hirai et al. ............... | 422/4 |
| 5,015,442 A | * | 5/1991 | Hirai ...................... | 422/121 |
| 5,034,032 A | | 7/1991 | Yikai et al. | |
| 5,055,115 A | * | 10/1991 | Yikai et al. ............... | 96/59 |
| 5,256,377 A | * | 10/1993 | Nakamaru et al. ......... | 422/122 |
| 5,445,798 A | * | 8/1995 | Ikeda et al. ............... | 422/121 |
| 5,698,165 A | | 12/1997 | Terada et al. | |
| 5,935,282 A | * | 8/1999 | Lin ........................ | 55/385.6 |
| 6,007,781 A | * | 12/1999 | Campbell et al. ......... | 422/122 |
| 6,171,373 B1 | * | 1/2001 | Park et al. ................ | 95/138 |
| 6,235,090 B1 | * | 5/2001 | Bernstein et al. ......... | 96/57 |
| 6,375,905 B1 | | 4/2002 | Moini et al. | |
| 6,592,655 B2 | * | 7/2003 | Iriyama et al. ........... | 96/138 |
| 6,890,366 B2 | * | 5/2005 | Bugli et al. ............... | 55/385.3 |
| 7,368,003 B2 | * | 5/2008 | Crapser et al. ........... | 96/52 |
| 2004/0040831 A1 | * | 3/2004 | Hong et al. .............. | 204/157.3 |
| 2005/0129589 A1 | | 6/2005 | Wei et al. | |
| 2005/0260113 A1 | * | 11/2005 | Twigg .................... | 423/239.1 |
| 2005/0271414 A1 | | 12/2005 | Katayama et al. | |

FOREIGN PATENT DOCUMENTS

| | | | |
|---|---|---|---|
| DE | 10355834 A1 | * | 7/2005 |
| EP | 0369163 A | | 5/1990 |

(Continued)

OTHER PUBLICATIONS

Machine translation of JP 10-043628 A from JPO website, 2008.*

(Continued)

*Primary Examiner*—Frank M Lawrence
(74) *Attorney, Agent, or Firm*—Winston & Strawn LLP (57) ABSTRACT

An air cleaner including ozone removal is provided according to an embodiment of the invention. The air cleaner includes an air channel in the air cleaner, an air moving unit located in the air channel and configured to create an airflow, and an ozone decomposing element located in and extending substantially fully across the air channel. The ozone decomposing element causes decomposition of ozone in the airflow.

63 Claims, 9 Drawing Sheets

FOREIGN PATENT DOCUMENTS

| | | | |
|---|---|---|---|
| EP | 1310293 A | | 5/2003 |
| JP | 10-043628 A | * | 2/1998 |
| WO | WO-2005097303 A | | 10/2005 |

OTHER PUBLICATIONS

Machine generated English translation of DE 10355834 A1, published Jul. 2005.*

Brookstone; Pure-Ion Advanced Air Purifier; www.brookstone.com/shop/product.asp?product_code=506840; Merrimack, New Hampshire.

Sharper Image; Extra OzoneGuard GP Grill for the Professional Series GP; www.sharperimage.com/us/en/catalog/productfaqs.jhtml?sku=SI149BLK; San Francisco, California.

Sharper Image; With OzoneGuard Professional Series Ionic Breeze Quadra Silent Air Purifier; www.sharperimage.com/us/en/catalog/productfaqs.jhtml?sku=SI830SNX; San Francisco, California.

Sharper Image; With OzoneGuard Professional Series Ionic Breeze Quadra Silent Air Purifier; www.sharperimage.com/us/en/catalog/productfaqs.jhtml?sku=SI857GRY; San Francisco, California.

Engelhard; PremAir Catalysts; www.engelhard.com/Lang1/xDocID62FC411F73D34305BB28EAE449E5728C/xDocTable_Product/Tab_Overview/TechnologyClassID0/MarketID0/TechnologyID0/ApplicationID0/up1/SubSiteID0; Iselin, New Jersey.

Engelhard; PremAir catalyts, Advancing ozone abatement in residential and commercial air conditioning systems; May 2004; Engelhard Corporation; Iselin, New Jersey.

Nikki-Universal Co., Ltd.; Environmental Catalyst; www.n-u.co.jp/products/e/environment.html; Tokyo, Japan.

NCI Mfg., Inc.; Honeycle; www.ncimfg.com/honeycle.htm; Scottsboro, Alabama.

* cited by examiner

AIR CLEANER INCLUDING OZONE REMOVAL

TECHNICAL FIELD

The present invention relates to an air cleaner, and more particularly, to an air cleaner including ozone removal.

BACKGROUND OF THE INVENTION

Air cleaners are widely used in home and office settings for cleaning the air. An air cleaner can filter the air in order to remove airborne contaminants. An air cleaner can therefore include any type of mechanical filter element comprising a mesh, a weave, a foam, etc.

In addition to filtering particles out of the air, an air cleaner can include an air ionizer (such as an electrostatic precipitator with a corona field or pre-ionizer element) that ionizes airflow passing through the air cleaner. The ionization transforms stable ($O_2$) molecules in the air into ozone molecules ($O_3$), where the ozone molecules are a by-product of the ionization process. Subsequently, the third oxygen atoms of the ozone molecules enter into destructive reactions with contaminants in the vicinity by oxidizing compounds they come into contact with. The oxidation can add oxygen molecules to these contacted compounds during the oxidation reaction.

Ozone is a powerful oxidizer because it is not a stable molecule. Ozone molecules spontaneously return to a stable, molecular state by releasing their third oxygen atoms. However, the spontaneous breakdown of ozone does not occur immediately, and substantial amounts of ozone can linger in the airstreams for some time.

One of the great advantages of ozone is that it is not selective in the reactions it initiates. It neutralizes; harmful volatile organic compounds (VOCs) by oxidizing them. Ozone destroys pathogens (microorganisms), either by reducing or destroying them or by cell lysing or oxidation. Another beneficial effect of ozone is that ozone treatment of the air can remove some troublesome odors.

However, the use of ozone for air cleaning has drawbacks. Being a highly unstable and reactive form of oxygen, the ozone also reacts with living matter. Moderate concentrations of ozone, such as levels above regulation limits (for example, limits suggested by Underwriters Laboratories Inc. (UL)), are known to cause headaches, nausea, and irritation of mucous membranes. Higher levels of ozone cause progressively more severe respiratory problems. As a result, ozone in higher concentrations can be troublesome to humans and animals. Consequently, ozone should desirably be removed from the air after generation.

Ozone removal filters are known. U.S. Pat. No. 6,375,905 to Moini et al. discloses an ozone removal filter that comprises an aluminum foil substrate that is impregnated with a catalyst. Air flows through the substrate, contacting the catalyst. The catalyst subsequently breaks down ozone in the airstream. The substrate of Moini comprises sandwiched sheets of aluminum foil. Each sheet receives a series of slits, with the sheet being subsequently stretched and twisted, wherein the slits are transformed into geometrically-shaped openings. Multiple such sheets are stacked together into a sandwich. The openings formed in one sheet do not align with the openings formed in adjacent sheets. Moini discloses that the airflow traveling through the substrate is forced to travel in a zig zag pattern (see FIGS. 6-7 and col. 8, lines 14-25). The assembled sandwich of multiple sheets can then be crimped or formed into a serpentine shape (see FIG. 8), allowing the final substrate to be shaped or formed.

SUMMARY OF THE INVENTION

An air cleaner including ozone removal is provided according to an embodiment of the invention. The air cleaner comprises an air channel in the air cleaner, an air moving unit located in the air channel and configured to create an airflow, and an ozone decomposing element located in and extending substantially fully across the air channel. The ozone decomposing element causes decomposition of ozone in the airflow.

An air cleaner including ozone removal is provided according to an embodiment of the invention. The air cleaner comprises an air channel in the air cleaner, an air moving unit located in the air channel and configured to create an airflow, and an ozone decomposing element located in the airflow. The ozone decomposing element comprises a substrate located in and extending substantially fully across the air channel and an ozone decomposing material formed on the substrate. The ozone decomposing element causes decomposition of ozone in the airflow.

An air cleaner including ozone removal is provided according to an embodiment of the invention. The air cleaner comprises an air channel in the air cleaner, an air moving unit located in the air channel and configured to create an airflow, and an ozone decomposing element located in the airflow. The ozone decomposing element comprises a ceramic paper matrix substrate and an ozone decomposing material formed on the substrate. The ozone decomposing element causes decomposition of ozone in the airflow.

An ozone removal method for an air cleaner is provided according to an embodiment of the invention. The method comprises providing an air channel in the air cleaner, providing an air moving unit located in the air channel and configured to create an airflow, and providing an ozone decomposing element located in and extending substantially fully across the airflow channel. The ozone decomposing element causes decomposition of ozone in the airflow.

BRIEF DESCRIPTION OF THE DRAWINGS

The same reference number represents the same element on all drawings. It should be noted that the drawings are not necessarily to scale.

DETAILED DESCRIPTION OF THE INVENTION

FIGS. 1-9 and the following descriptions depict specific embodiments to teach those skilled in the art how to make and use the best mode of the invention. For the purpose of teaching inventive principles, some conventional aspects have been simplified or omitted. Those skilled in the art will appreciate variations from these embodiments that fall within the scope of the invention. Those skilled in the art will also appreciate that the features described below can be combined in various ways to form multiple variations of the invention. As a result, the invention is not limited to the specific embodiments described below, but only by the claims and their equivalents.

Figure 1:
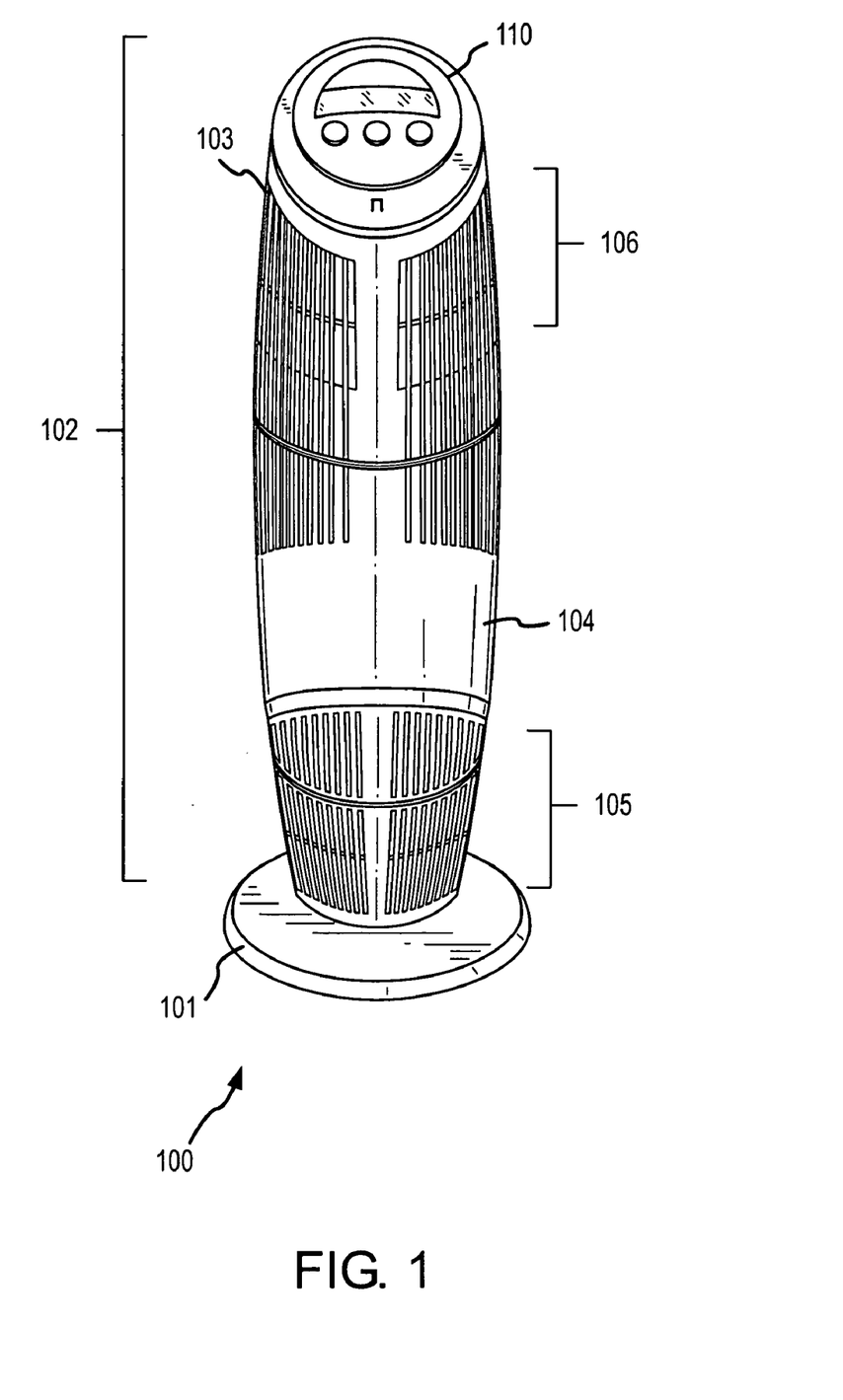
FIG. 1 shows a tower air cleaner according to an embodiment of the invention.

FIG. 1 shows a tower air cleaner 100 according to an embodiment of the invention. The air cleaner 100 includes a base portion 101 and a tower portion 102. The tower portion 102 can be generally vertically positioned and elongate in shape. In one embodiment, the tower portion 102 can be substantially cylindrical in shape. The tower portion 102 includes a shell 103, one or more doors 104, and a control panel 110. The tower portion 102 further includes an air inlet 105 and an air outlet 106. Air is drawn in through the air inlet 105, is cleaned inside the tower portion 102, and the cleaned air is exhausted from the air outlet 106.

The air inlet 105 is shown as being at the lower end of the tower portion 102. However, it should be understood that alternatively the relative positions of the air inlet 105 and the air outlet 106 could be interchanged.

Figure 2:
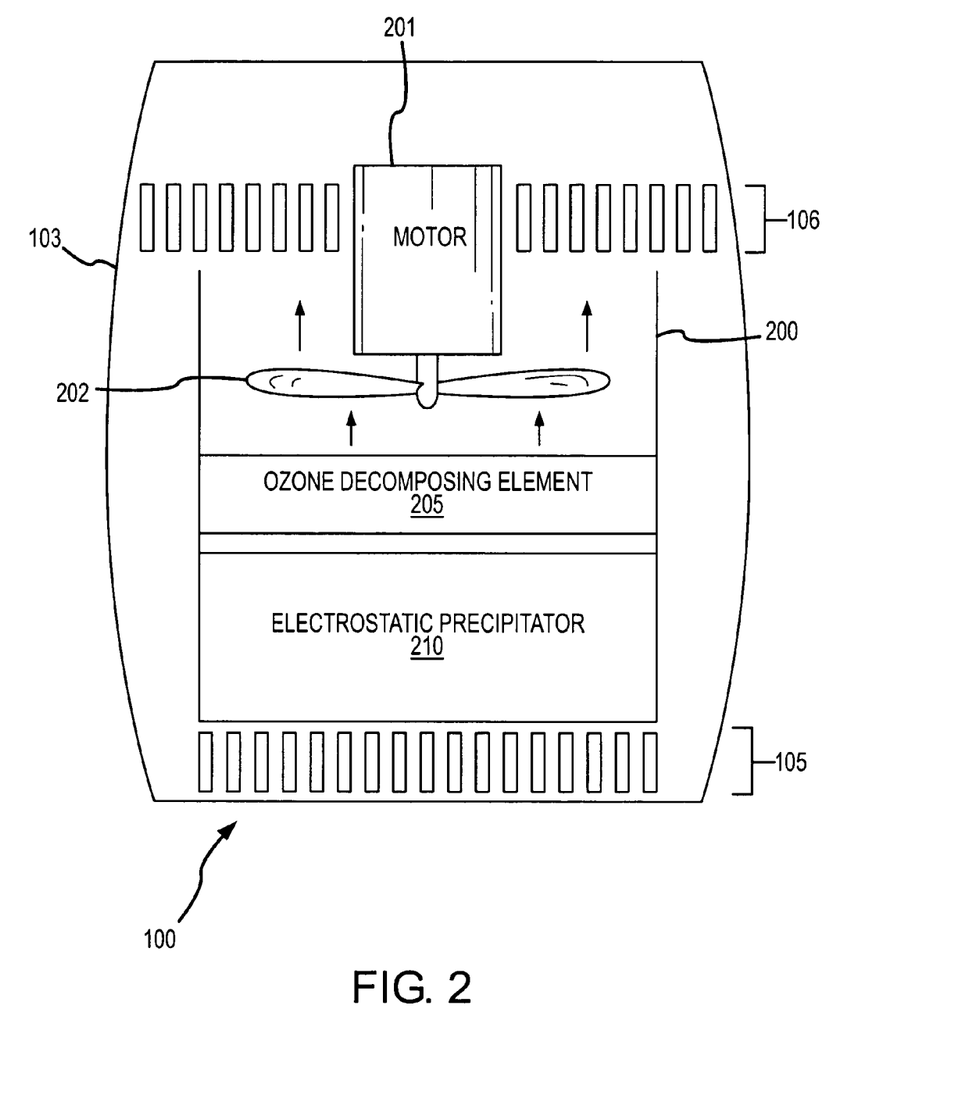
FIG. 2 shows at least a portion of the internal components of the air cleaner according to an embodiment of the invention.

FIG. 2 shows at least a portion of the internal components of the air cleaner 100 according to an embodiment of the invention. The air cleaner 100 in this embodiment includes a substantially vertical air channel 200, a motor 201 and corresponding impeller 202 located in the air channel 200, an ozone decomposing element 205, and an electrostatic precipitator 210. The motor 201 and impeller 202 generate airflow through the air cleaner 100 (see arrows). The ozone decomposing element 205 can be located below the motor 201 and impeller 202, as shown, or can be positioned above the motor 201 and impeller 202 and in the airflow. The ozone decomposing element 205 is located in and extends substantially fully across the air channel 200 and therefore the airflow passes through the electrostatic precipitator 210 and through the ozone decomposing element 205. The ozone decomposing element 205, because it extends fully across the air channel 200, does not allow a portion of airflow to exit without scrubbing. After the ozone has reacted with contaminants in the airflow, the remaining or excess ozone is removed by the ozone decomposing element 205. The ozone decomposing element 205 removes a significant amount of the ozone that is generated by the electrostatic precipitator 210. The air cleaner 100 therefore provides the sterilizing and sanitizing benefits of ozone, but without the negative implications of human exposure to unacceptable levels of ozone.

The electrostatic precipitator 210 can comprise a source of ozone. The electrostatic precipitator 210 electrostatically charges dirt and debris particles in the airflow and then collects the charged particles on one or more collection plates. An electrostatic precipitator can produce relatively small amounts of ozone as a by-product. It is desirable to remove this ozone from the airflow of the air cleaner 100.

The ozone decomposing element 205 decomposes ozone in the airflow. The ozone decomposing element 205 is located in and extends substantially fully across the airflow, wherein airflow leaving the electrostatic precipitator 210 must pass through the ozone decomposing element 205. The ozone decomposing element 205 can comprise a plurality of air channels that are substantially aligned with the airflow. Because the ozone decomposing element 205 employs a catalytic reaction to scrub ozone, the ozone decomposing element 205 essentially comprises a lifetime ozone filter.

The air cleaner 100 can comprise a tower configuration, like that shown in FIG. 1, or can comprise any other configuration, such as substantially rectangular, substantially round, etc. The air cleaner 100 can comprise a floor air cleaner model, a table top air cleaner model, a portable or personal air cleaner model, etcetera (see also FIG. 9).

Figure 3:
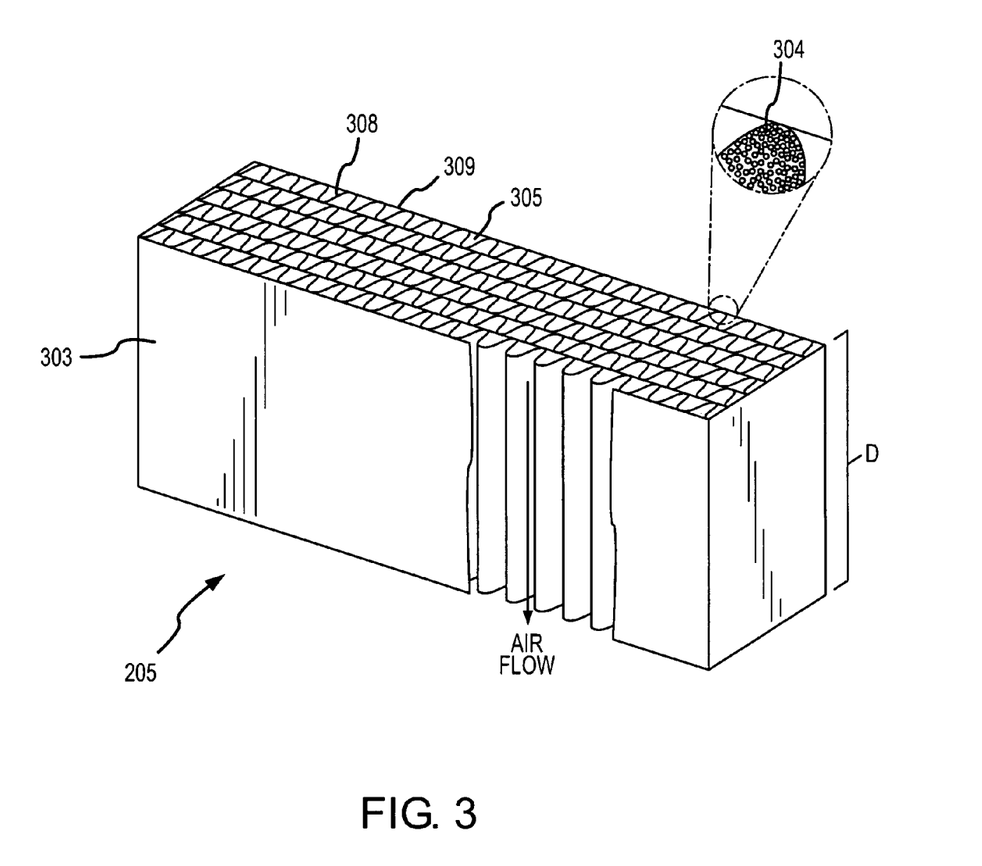
FIG. 3 shows an ozone decomposing element according to an embodiment of the invention.

FIG. 3 shows the ozone decomposing element 205 according to an embodiment of the invention. The ozone decomposing element 205 comprises a substrate 303 and an ozone decomposing material 304 formed on the substrate 303 (see insert). Alternatively, the ozone decomposing material 304 may be at least partially embedded in the substrate 303. The substrate 303 can optionally include a frame (not shown) that supports the substrate and retains the ozone decomposing element 205 in the air cleaner 100.

The substrate 303 includes a depth D. The depth D can be chosen according to various factors, including the available space in the air cleaner 100, the velocity of the airflow, the desired back pressure or pressure drop across the ozone decomposing element 205, the needed surface area of the substrate 303, etc.

The substrate 303 comprises a plurality of substantially depth-wise air channels 305. The air channels 305 in one embodiment are substantially continuous through the substrate 303. The air channels 305 in one embodiment are substantially linear through the substrate 303. The air channels 305 in one embodiment are substantially parallel to each other. Advantageously, the air channels 305 therefore present minimal obstruction to the airflow and as a result the ozone decomposing element 205 generates minimal back-pressure. The air channels 305 can be substantially co-linear and aligned with the airflow, as previously discussed. The air channels 305 can comprise a substantially honeycomb block, for example. Therefore, the substrate 303 can act as a flow straightener and can provide a substantially smooth and aligned airflow into the impeller 202.

The air channels 305 can be formed in various ways, such as by crimping or forming, bonding, deposition or forming of fibers, aeration or heating of materials, stretching, etc. In the embodiment shown, the air channels 305 are substantially straight and the cross-sectional shape of an air channel 305 is substantially regular. Alternatively, the air channels 305 can be formed in irregular cross-sectional shapes and do not have to be co-linear and aligned with the airflow.

The air channels 305 can comprise any cross-sectional size. For example, where the air channels 305 are relatively large, the substrate 303 can comprise 80 cells per square inch, or less. Such a large cell size will result in a relatively low back pressure presented by the substrate 303. In another example, where the air channels 305 are relatively small, the substrate 303 can comprise more than 80 cells per square inch, or more. Such a small cell size will result in a higher back pressure but will provide more reactive surface area and therefore more efficient ozone decomposition. However, it should be understood that the substrate 303 according to the invention beneficially provides a much lower back pressure than generated by typical foam or pleated style filters.

In the embodiment shown, the air channels 305 are formed by series of substantially serpentine sheets 308 interspersed with substantially planar divider sheets 309. The sheets 308 and 309 can comprise any suitable materials. The substrate 303 can comprise any number of serpentine sheets 308 and planar divider sheets 309, wherein the substrate 303 can be formed to a desired shape and size. However, it should be understood that the air channels 305 can include other cross-sectional shapes, including octagonal, hexagonal, circular, irregular, etc.

In one embodiment, the substrate 303 is formed of a metal matrix, such as an aluminum matrix, for example. The metal matrix allows some compression, wherein the metal matrix can accommodate some shaping. In another embodiment, the substrate 303 is formed of a ceramic/paper matrix.

The ozone decomposing material 304 interacts with and decomposes ozone that impinges on the ozone decomposing element 205. Because the airflow must flow through the ozone decomposing element 205, the ozone decomposition is substantially complete and uniform.

In one embodiment, the ozone decomposing material 304 comprises a metal oxide deposited on the substrate 303. Ozone reacts with the metal oxide and decomposes. In one embodiment, the ozone decomposing material 304 comprises manganese oxide ($MnO_2$). However, it should be understood that the ozone decomposing material 304 can comprise any manner of suitable metal oxide.

Figure 4:
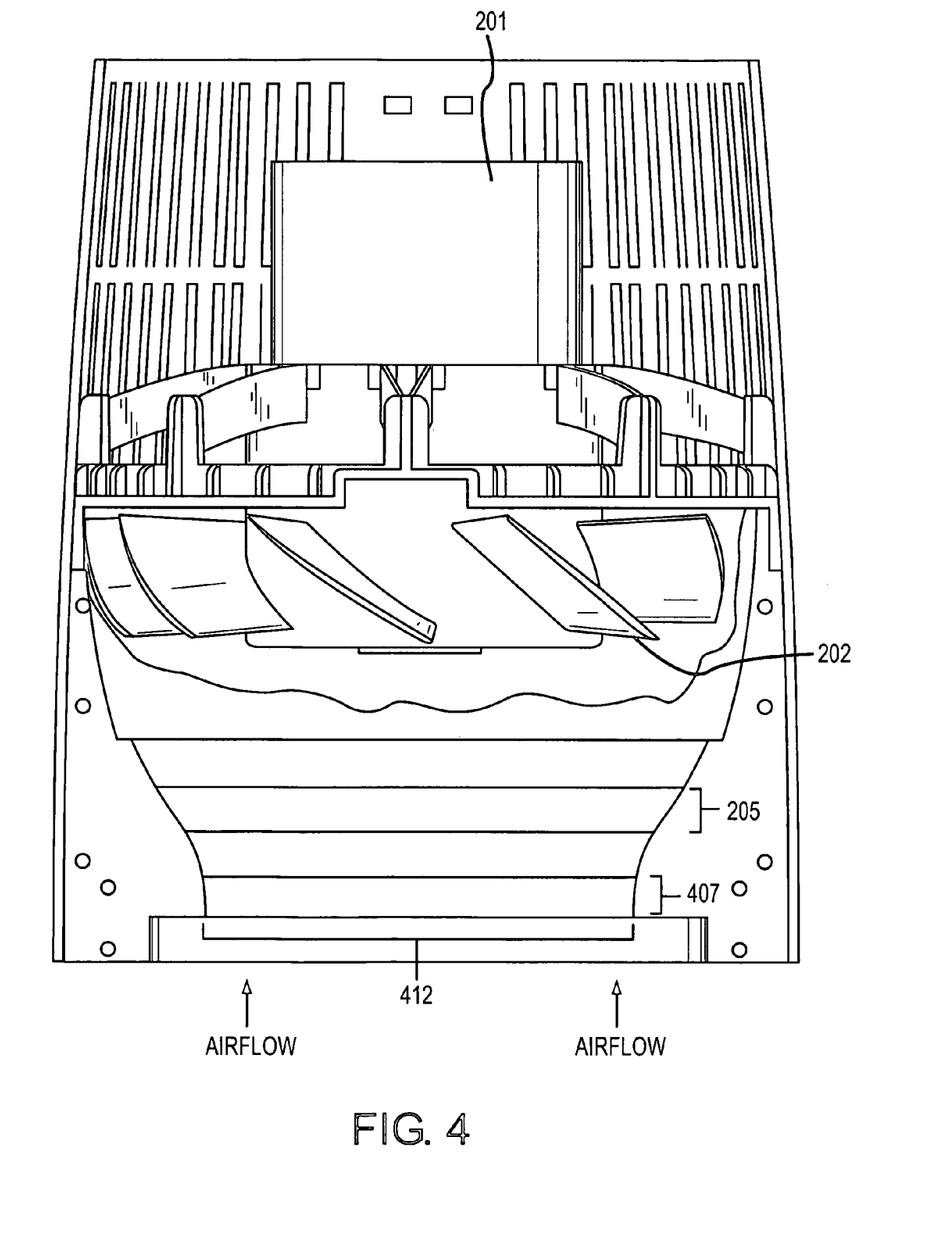
FIG. 4 shows a cutaway view of a portion of the air cleaner according to an embodiment of the invention.

FIG. 4 shows a cutaway view of a portion of the air cleaner 100 according to an embodiment of the invention. In this embodiment, the air cleaner 100 includes the motor 201, the impeller 202, and the ozone decomposing element 205. In addition, in this embodiment the air cleaner 100 further includes a volatile organic chemical (VOC) filter 407 for removing volatile organic chemicals and/or odors from the airflow. The composition of the VOC filter 407 can be customized to target specific VOCs and/or specific odors. The motor 201, the impeller 202, the ozone decomposing element 205, and the VOC filter 407 are located in an airflow channel 412.

The VOC filter 407 is upstream of the ozone decomposing element 205 in the embodiment shown. However, it should be understood that the two components can be swapped. Together, the ozone decomposing element 205 and the VOC filter 407 remove a very high proportion of contaminants that can cause odors, irritation, or health problems. Alternatively, in another embodiment the ozone decomposing element 205 can further include a VOC removal/decomposing material, in addition to the ozone decomposing material.

Figure 5:
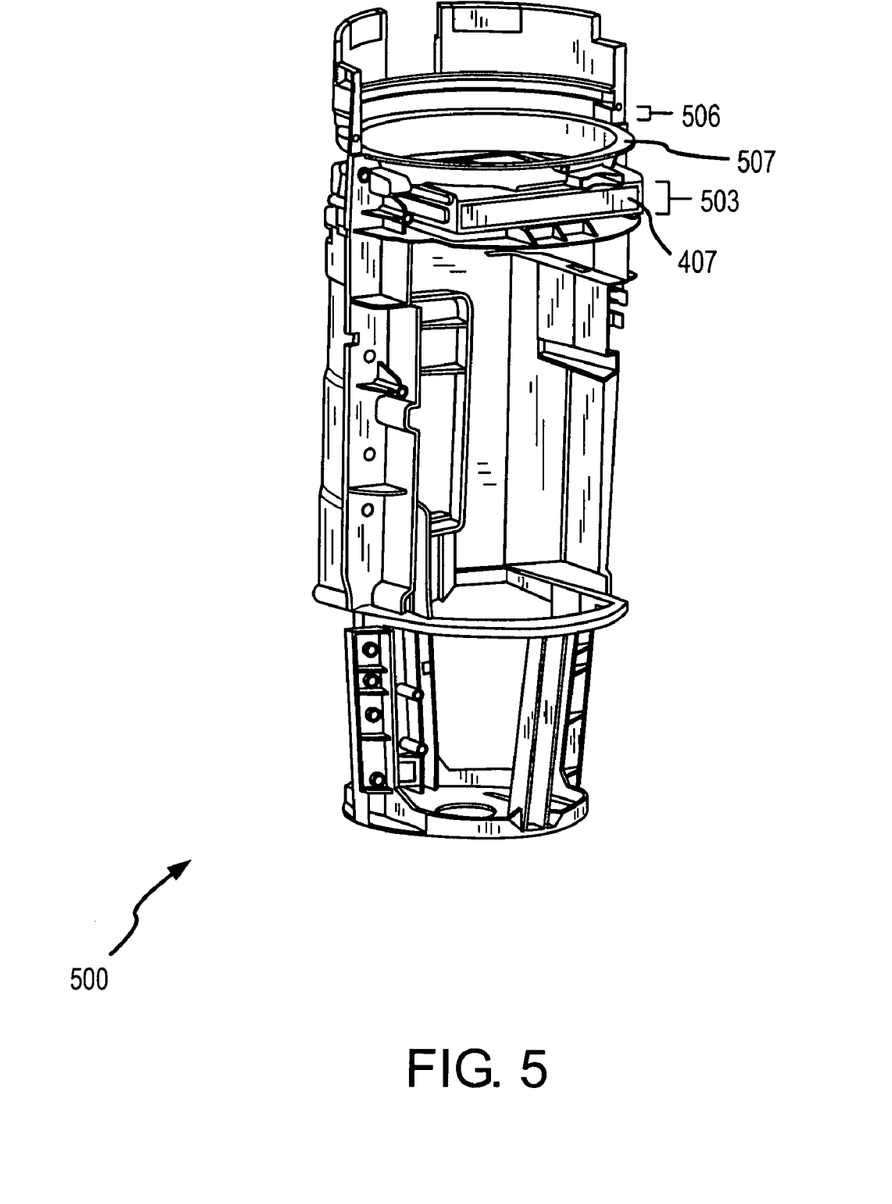
FIG. 5 shows a frame for the air cleaner according to an embodiment of the invention.

FIG. 5 shows a frame 500 for the air cleaner 100 according to an embodiment of the invention. The frame 500 includes a VOC filter receptacle 503 and an ozone filter receptacle 506. The VOC filter receptacle 503 receives the VOC filter 407. The ozone filter receptacle 506 includes an ozone filter support ring 507, wherein an ozone filter 220 (see FIGS. 6-8) rests on the ozone filter support ring 507.

Figure 6:
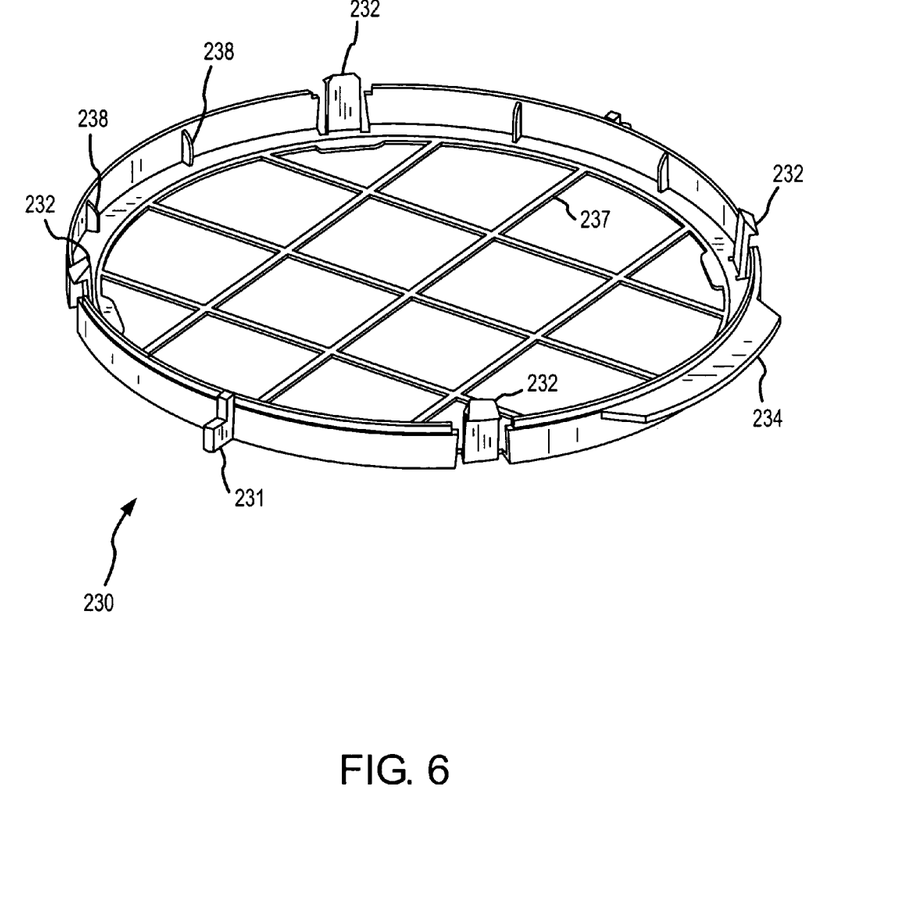
FIG. 6 shows an ozone frame lower portion according to an embodiment of the invention.

FIG. 6 shows an ozone frame lower portion 230 according to an embodiment of the invention. The ozone frame lower portion 230 assembles to an ozone frame upper portion 250 in order to form an ozone filter 220 (see FIG. 8). The ozone frame lower portion 230 includes at least one alignment rib 231, one or more frame fastener projections 232, at least one handling projection 234, a plurality of bottom support members 237, and a plurality of retention ribs 238. The at least one alignment rib 231 can engage a feature of the frame 500 when inserted into the frame 500. The one or more frame fastener projections 232 engage corresponding frame fastener apertures 252 in the ozone frame upper portion 250 (see FIGS. 7-8). The at least one handling projection 234 can be grasped in order to insert and/or remove the assembled ozone filter 220. In addition, the projection 234 can also serve to perform alignment during assembly so that the ozone filter 220 is not inserted upside down or backwards into the frame 500. As a result, in one embodiment the projection 234 fits into a corresponding aperture in the frame 500. The plurality of bottom support members 237 support a bottom surface of the ozone decomposing element 205. The plurality of retention ribs 238 engage and exert a nominal amount of compression force on a side or sides of the ozone decomposing element 205. The plurality of retention ribs 238 therefore firmly hold the ozone decomposing element 205 and prevent it from moving or rotating within the assembled ozone filter frame 222.

Figure 7:
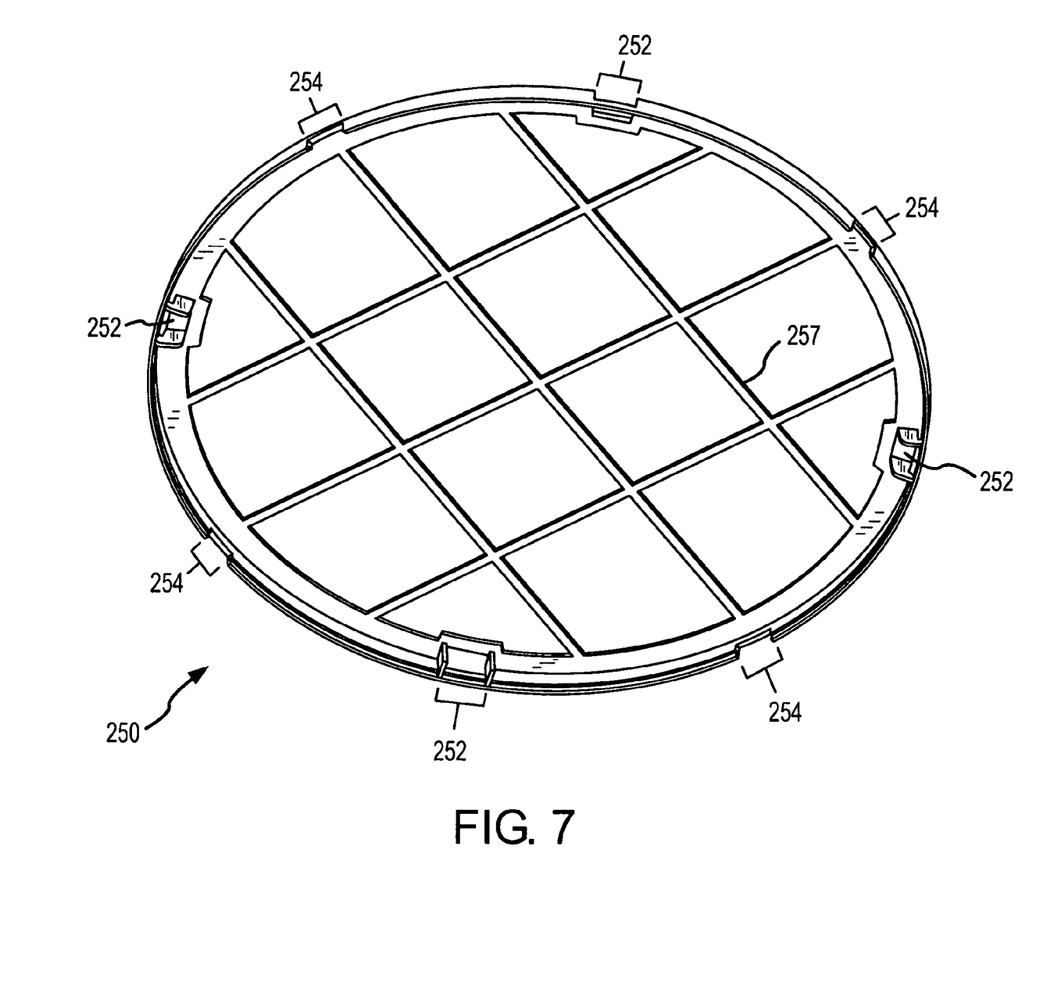
FIG. 7 shows an ozone frame upper portion according to an embodiment of the invention.

FIG. 7 shows an ozone frame upper portion 250 according to an embodiment of the invention. The ozone frame upper portion 250 includes one or more frame fastener apertures 252, at least one alignment notch 254, and a plurality of top support members 257. The one or more frame fastener apertures 252 receive the one or more frame fastener projections 232 of FIG. 6. The one or more frame fastener projections 232 can be received in the one or more frame fastener apertures 252 in a spring, friction, or snap fit, for example. The at least one alignment notch 254 receives at least a portion of the at least one alignment rib 231 of FIG. 6. The alignment rib 231 can fit into the alignment notch 254 and can guide the one or more frame fastener projections 232 into the one or more frame fastener apertures 252. The plurality of top support members 257 retain the ozone decomposing element 205 within the assembled ozone filter frame 222.

Figure 8:
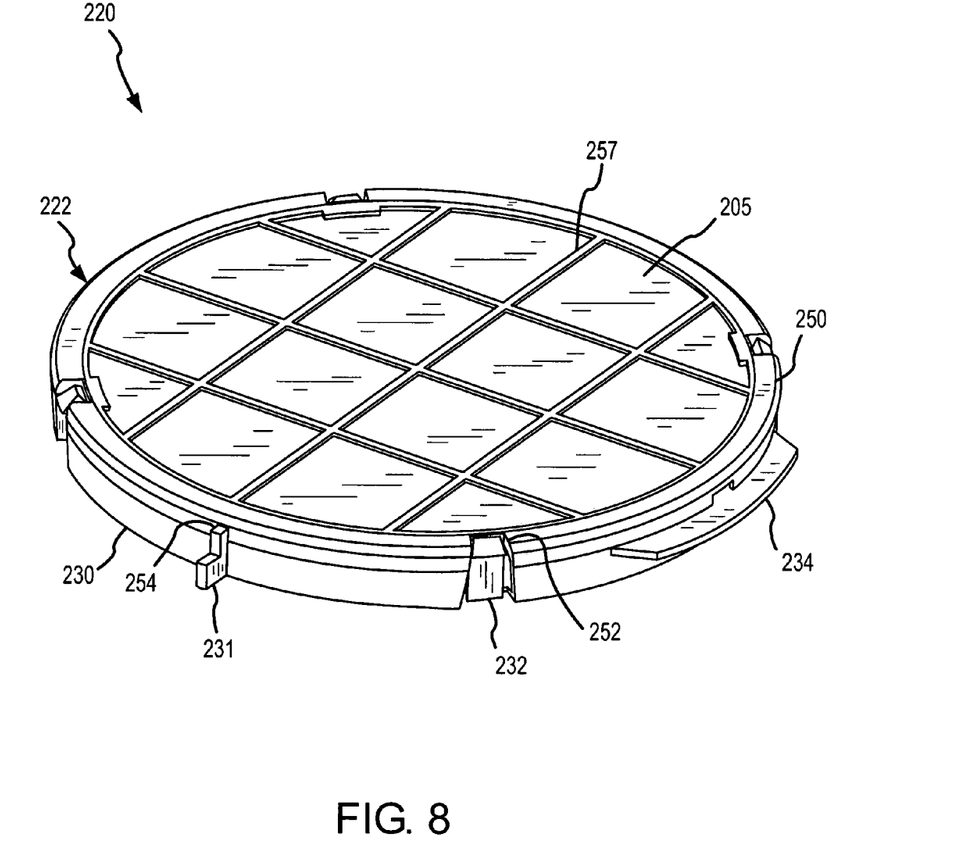
FIG. 8 shows an assembled ozone filter according to an embodiment of the invention.

FIG. 8 shows an assembled ozone filter 220 according to an embodiment of the invention. The ozone frame lower portion 230 and the ozone frame upper portion 250 are assembled to form the ozone filter frame 222. The ozone decomposing element 205 is held within the assembled ozone filter frame 222. The air channels 305 in the ozone decomposing element 205 are substantially vertical in the figure. The ozone filter 220 can be positioned in the ozone filter receptacle 506 of FIG. 5, on the ozone filter support ring 507.

Figure 9:
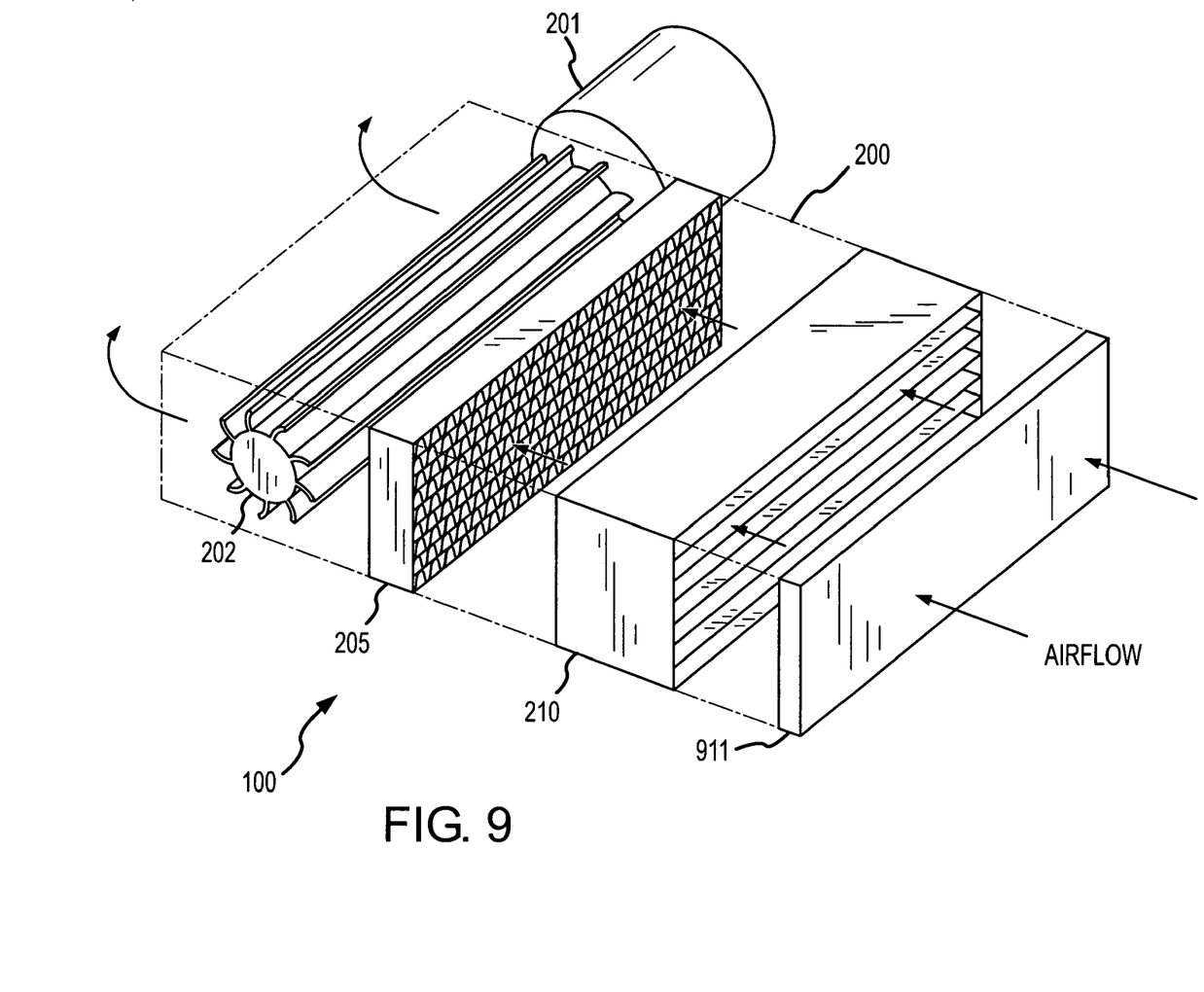
FIG. 9 shows the air cleaner according to an embodiment of the invention.

FIG. 9 shows the air cleaner 100 according to an embodiment of the invention. The air cleaner 100 in this embodiment includes a substantially horizontal air channel 200 and a substantially horizontal airflow (see arrows). The impeller 202 in this embodiment comprises a squirrel cage fan 202 that pulls air through an optional pre-filter 911, the electrostatic precipitator 210, and through the ozone decomposing element 205. In addition, the air cleaner 100 can include a VOC filter 407 (not shown) located before or after the ozone decomposing element 205.

The air cleaner according the invention can be implemented according to any of the embodiments in order to obtain several advantages, if desired. The invention provides an air cleaner that uses ozone to kill living organisms in an airflow. The invention provides an air cleaner that uses ozone to neutralize airborne contaminants. The invention provides an air cleaner that uses ozone to remove odors from an airflow. The invention provides an air cleaner that removes ozone from an airflow.

The invention claimed is:

1. An air cleaner including ozone removal, the air cleaner comprising:
    an air channel in the air cleaner;
    an air moving unit located in the air channel and configured to create an airflow;
    an electrostatic precipitator located in the air channel;
    an ozone decomposing element support; and
    an ozone decomposing element downstream of the electrostatic precipitator, comprising a substrate that is located in and extends substantially fully across the air channel; and
    an ozone generator disposed in the airflow prior to the ozone decomposing element,
    wherein the ozone decomposing element causes decomposition of ozone in the airflow and the substrate is supported by the ozone decomposing element support in the airflow.

2. The air cleaner of claim 1, with the substrate comprising a metal matrix substrate or a ceramic paper matrix.

3. The air cleaner of claim 1, with the ozone decomposing element comprising a plurality of air channels that are substantially aligned with the airflow.

4. The air cleaner of claim 1, with the ozone decomposing element comprising:
an ozone decomposing material formed on the substrate.

5. The air cleaner of claim 1, with the substrate comprising an airflow straightening matrix.

6. The air cleaner of claim 1,
the substrate including a depth and a plurality of substantially depth-wise air channels formed through the substrate; and
the ozone decomposing element comprising an ozone decomposing material formed on or at least partially embedded in the substrate.

7. The air cleaner of claim 6, with the plurality of air channels being substantially continuous through the substrate.

8. The air cleaner of claim 6, with the plurality of air channels being substantially linear through the substrate.

9. The air cleaner of claim 1, with
the substrate including a depth and a plurality of substantially depth-wise, regular air channels formed through the substrate; and
the ozone decomposing element comprising an ozone decomposing material formed on or at least partially embedded in the substrate.

10. The air cleaner of claim 1, with the ozone decomposing element comprising:
an ozone decomposing material formed on or at least partially embedded in the substrate.

11. The air cleaner of claim 1, with the ozone decomposing element comprising:
an ozone decomposing material formed on or at least partially embedded in the substrate, with the ozone decomposing material comprising a metal oxide.

12. The air cleaner of claim 1, with the ozone decomposing element comprising:
an ozone decomposing material formed on or at least partially embedded in the substrate, with the ozone decomposing material comprising manganese oxide ($MnO_2$).

13. The air cleaner of claim 1, with the ozone decomposing element further comprising a volatile organic compound (VOC) filter.

14. The air cleaner of claim 1, with the air cleaner further comprising a volatile organic compound (VOC) filter element.

15. The air cleaner of claim 4, with the substrate comprising:
a plurality of spaced-apart, substantially planar divider sheets; and
a plurality of substantially serpentine sheets interspersed between the plurality of divider sheets.

16. The air cleaner of claim 1, with the air channel comprising a substantially vertical air channel.

17. The air cleaner of claim 1, with the air channel comprising a substantially horizontal air channel.

18. An air cleaner including ozone removal, the air cleaner comprising:
an air channel in the air cleaner;
an air moving unit located in the air channel and configured to create an airflow;
an electrostatic precipitator located in the air channel;
an ozone decomposing element located in the airflow downstream of the electrostatic precipitator, with the ozone decomposing element comprising a substrate located in and extending substantially fully across the air channel and an ozone decomposing material formed on or at least partially embedded in the substrate; and
an ozone generator disposed in the airflow prior to the ozone decomposing element;
wherein the ozone decomposing element causes decomposition of ozone in the airflow.

19. The air cleaner of claim 18, with the substrate comprising:
a plurality of spaced-apart, substantially planar divider sheets; and
a plurality of substantially serpentine sheets interspersed between the plurality of divider sheets.

20. The air cleaner of claim 18, with the ozone decomposing element comprising a plurality of air channels that are substantially aligned with the airflow.

21. The air cleaner of claim 20, with the plurality of air channels being substantially continuous through the substrate.

22. The air cleaner of claim 20, with the plurality of air channels being substantially linear through the substrate.

23. The air cleaner of claim 18, with the substrate including a depth and a plurality of substantially depth-wise air channels formed through the substrate.

24. The air cleaner of claim 18, with the substrate including a depth and a plurality of substantially depth-wise, regular air channels formed through the substrate.

25. The air cleaner of claim 18, with the substrate comprising an airflow straightening matrix.

26. The air cleaner of claim 18, with the substrate comprising a metal matrix substrate.

27. The air cleaner of claim 18, with the substrate comprising a ceramic paper matrix substrate.

28. The air cleaner of claim 18, with the ozone decomposing material comprising a metal oxide.

29. The air cleaner of claim 18, with the ozone decomposing material comprising a manganese oxide ($MnO_2$).

30. The air cleaner of claim 18, with the ozone decomposing element further comprising a volatile organic compound (VOC) filter.

31. The air cleaner of claim 18, with the air cleaner further comprising a volatile organic compound (VOC) filter element.

32. The air cleaner of claim 18, with the air channel comprising a substantially vertical air channel.

33. The air cleaner of claim 18, with the air channel comprising a substantially horizontal air channel.

34. An air cleaner including ozone removal, the air cleaner comprising:
an air channel in the air cleaner;
an air moving unit located in the air channel and configured to create an airflow;
an ozone decomposing element support comprising a first portion, second portion;
an ozone decomposing element located in and extending substantially fully across the air channel, with the ozone decomposing element comprising a substrate and an ozone decomposing material formed on or at least partially embedded in the substrate;
an electrostatic precipitator disposed in the airflow prior to the ozone decomposing element; and
an ozone generator disposed in the airflow prior to the ozone decomposing element,
wherein the ozone decomposing element causes decomposition of ozone in the airflow, the substrate is disposed within the first portion and the second portion of the ozone decomposing element support.

35. The air cleaner of claim 34, with the substrate comprising a metal matrix substrate or a ceramic paper matrix.

36. The air cleaner of claim 34, with the ozone decomposing element comprising a plurality of air channels that are substantially aligned with the airflow.

37. The air cleaner of claim 36, with the plurality of air channels being substantially continuous through the substrate.

38. The air cleaner of claim 36, with the plurality of air channels being substantially linear through the substrate.

39. The air cleaner of claim 34, with the substrate including a depth and a plurality of substantially depth-wise air channels formed through the substrate.

40. The air cleaner of claim 34, with the substrate including a depth and a plurality of substantially depth-wise, regular air channels formed through the substrate.

41. The air cleaner of claim 34, with the substrate comprising an airflow straightening matrix.

42. The air cleaner of claim 34, with the ozone decomposing material comprising a metal oxide.

43. The air cleaner of claim 34, with the ozone decomposing material comprising manganese oxide ($MnO_2$).

44. The air cleaner of claim 34, with the ozone decomposing element further comprising a volatile organic compound (VOC) filter.

45. The air cleaner of claim 34, with the air cleaner further comprising a volatile organic compound (VOC) filter element.

46. The air cleaner of claim 34, with the substrate comprising:
a plurality of spaced-apart, substantially planar divider sheets; and
a plurality of substantially serpentine sheets interspersed between the plurality of divider sheets.

47. The air cleaner of claim 34, with the air channel comprising a substantially vertical air channel.

48. The air cleaner of claim 34, with the air channel comprising a substantially horizontal air channel.

49. An ozone removal method for an air cleaner, comprising:
providing an air channel in the air cleaner;
creating an airflow in the air channel with an air moving unit;
providing an electrostatic precipitator located in the air channel;
providing an ozone decomposing element downstream of the electrostatic precipitator, comprising a substrate that is located in and extends substantially fully across the air channel;
providing an ozone generator disposed in the airflow prior to the ozone decomposing element;
supporting the substrate in the airflow with an ozone decomposing element support; and
decomposing ozone in the airflow using the ozone decomposing element.

50. The method of claim 49, with the ozone decomposing element comprising a plurality of air channels that are substantially aligned with the airflow.

51. The method of claim 49, with the ozone decomposing element comprising:
an ozone decomposing material formed on or at least partially embedded in the substrate.

52. The method of claim 49, with the substrate comprising an airflow straightening matrix.

53. The method of claim 49, with
the substrate including a depth and a plurality of substantially depth-wise air channels formed through the substrate; and
the ozone decomposing element comprising an ozone decomposing material formed on or at least partially embedded in the substrate.

54. The method of claim 53, with the plurality of air channels being substantially continuous through the substrate.

55. The method of claim 53, with the plurality of air channels being substantially linear through the substrate.

56. The method of claim 49, with
the substrate including a depth and a plurality of substantially depth-wise, regular air channels formed through the substrate; and
the ozone decomposing element comprising an ozone decomposing material formed on or at least partially embedded in the substrate.

57. The method of claim 49, with the ozone decomposing element comprising:
an ozone decomposing material formed on or at least partially embedded in the substrate, with the ozone decomposing material comprising a metal oxide.

58. The method of claim 49, with the ozone decomposing element comprising:
an ozone decomposing material formed on or at least partially embedded in the substrate, with the ozone decomposing material comprising manganese oxide ($MnO_2$).

59. The method of claim 49, with the ozone decomposing element further comprising a volatile organic compound (VOC) filter.

60. The method of claim 49, with the air cleaner further comprising a volatile organic compound (VOC) filter element.

61. The method of claim 49, with the substrate comprising:
a plurality of spaced-apart, substantially planar divider sheets; and
a plurality of substantially serpentine sheets interspersed between the plurality of divider sheets.

62. The method of claim 49, with the air channel comprising a substantially vertical air channel.

63. The method of claim 49, with the air channel comprising a substantially horizontal air channel.

* * * * *

UNITED STATES PATENT AND TRADEMARK OFFICE
CERTIFICATE OF CORRECTION

| | | |
|---|---|---|
| PATENT NO. | : 7,857,890 B2 | Page 1 of 1 |
| APPLICATION NO. | : 11/364444 | |
| DATED | : December 28, 2010 | |
| INVENTOR(S) | : Paterson et al. | |

It is certified that error appears in the above-identified patent and that said Letters Patent is hereby corrected as shown below:

Column 6:
Line 55 (claim 1, line 7), after "support;" delete "and".

Signed and Sealed this
Fifteenth Day of February, 2011

David J. Kappos
*Director of the United States Patent and Trademark Office*